United States Patent [19]

McDaniel

[11] Patent Number: 4,616,725

[45] Date of Patent: Oct. 14, 1986

[54] SUSPENSION SYSTEM FOR OPERATOR'S COMPARTMENT

[75] Inventor: Donald E. McDaniel, Clintonville, Pa.

[73] Assignee: Joy Manufacturing Company, Pittsburgh, Pa.

[21] Appl. No.: 575,952

[22] Filed: Feb. 1, 1984

[51] Int. Cl.[4] .............................................. B62D 33/06

[52] U.S. Cl. ................................ 180/89.13; 180/326; 187/8.59; 175/219

[58] Field of Search ..................... 180/89.13, 317, 326, 180/327; 187/8.59; 296/190; 175/219

[56] References Cited

U.S. PATENT DOCUMENTS

| | | | |
|---|---|---|---|
| 2,774,435 | 12/1956 | Milliken | 180/41 |
| 2,861,449 | 11/1958 | Coman | 187/8.59 |
| 2,891,636 | 6/1959 | Krieger et al. | 187/8.59 |
| 2,970,664 | 2/1961 | Hoover et al. | 180/41 |
| 3,067,830 | 12/1962 | Lee | 180/233 |
| 3,675,976 | 7/1972 | Luft | 308/3 R |
| 3,885,643 | 5/1975 | Goodbary | 180/89.13 |
| 4,078,629 | 3/1978 | Kutay et al. | 180/89.13 |
| 4,157,878 | 6/1979 | Jamison | 405/303 |
| 4,250,975 | 2/1981 | Cobb et al. | 180/89.13 |
| 4,275,800 | 6/1981 | Batzel | 180/317 |
| 4,365,682 | 12/1982 | Frey et al. | 180/89.13 |

FOREIGN PATENT DOCUMENTS

| | | | |
|---|---|---|---|
| 546331 | 7/1956 | Italy | 187/8.59 |

*Primary Examiner*—John J. Love
*Assistant Examiner*—Kenneth R. Rice
*Attorney, Agent, or Firm*—Raymond W. Augustin

[57] ABSTRACT

A suspension system for an operator's compartment of a mine vehicle. The mine vehicle is of the type having a body wherein the operator's compartment is floatingly supporting on the body adjacent one side thereof for riding on the mine floor as the vehicle moves in the mine. The suspension system includes a vertical guide secured to the body for supporting and guiding rollers which are mounted on the compartment. A chain and sheave arrangement is connected between the vehicle body and the operator's compartment and acts to simultaneously lift both ends of the vehicle compartment in response to vertical forces developed between the mine floor and any point on the operator's compartment. The chain sheave arrangement acts to lift each end of the operator's compartment the same vertical distance with respect to the body thereby keeping the compartment level with respect to the body at all times.

15 Claims, 12 Drawing Figures

SUSPENSION SYSTEM FOR OPERATOR'S COMPARTMENT

BACKGROUND OF THE INVENTION

1. Field of the Invention

This invention relates to an operator's compartment that is supported for independent up and down movement on the side wall of a self propelled mine vehicle, and more particularly to an operator's compartment arranged to move upwardly and downwardly independent of the up and down movement of the vehicle as the mine vehicle moves over the uneven surface of the mine floor.

2. Description of the Prior Art

Self propelled mine vehicles, such as shuttle cars and continuous mining machines are used in mines for mining and transporting dislodged material from a mine face. A typical shuttle car includes a longitudinally extending compartment in which the mined material is loaded and after loading, the shuttle car moves from an area adjacent the mine face to a fixed haulage system where the coal is discharged from the shuttle car onto a conveyor belt.

The mine vehicles are controlled from an operator's compartment that is secured either rigidly or floatingly to the side wall of the vehicle body. Suitable controlls are provided on the operator's compartment by which the operator controls the movement of the vehicle between the mine face and the discharge point and operates the conveyor of the haulage compartment.

The machine operator in the operator's compartment is exposed to the mine roof and is, therefore, subject to serious injury from falling debris. Mine safety requirements now require that the machine operator be protected from overhead debris falling from the roof. Thus it has become the practice to utilize overhead canopies for protecting operator's of various equipment in the mine from the hazards of roof falls. For some shuttle cars and mining machines, however, the limited overhead clearance of the operator's compartment hinders the installation of the canopy particularly when the vehicle is operated in a mine having a height of less than 48 inches. With the operator's compartment fixed on the vehicle and raised on the mine floor by the necessary ground clearance between the bottom of the compartment in the mine roof, there is insufficient clearance above the top of the shuttle car for installation of an overhead protective canopy. Furthermore, when there is little clearance between the top of the canopy and the mine roof, the canopy will strike the mine roof as the shuttle car moves upwardly and downwardly as it travels over the undulating surface of the mine floor.

U.S. Pat. Nos. 4,078,629 and 4,157,878 disclose operator's compartments which float relative to the body of a shuttle car vehicle. These compartments are mounted on the shuttle car vehicle body for vertical movement with respect thereto by rails mounted on the compartment which engage guides. mounted on the vehicle body. It has been found that under actual operations the rails of the designs of these patents have a tendency to bind in the guides when the operator's compartment is cocked as when only one end engages an undulation in the mine floor as the shuttle car traverses the mine. This engagement with an undulation tends to rotate the operator's compartment by lifting the end thereof which is engaging the undulation while no equal force is lifting the opposite end of the compartment with the end result causing a binding in the tracks of U.S. Pat. Nos. 4,078,629 and 4,157,878.

An additional U.S. Pat. No. 4,146,106 discloses an operator's compartment which can be either free floating or be raised to be above the level of the undulations on the mine floor. Again this design utilizes rollers and rails to interface between the free floating operator's compartment and the vehicle body. Like the patents discussed above if the forward end of the operator's compartment encounters a large undulation in the mine floor the entire compartment can be cocked thereby inhibiting the free floating action of the compartment.

U.S. Pat. No. 2,970,664 discloses a suspension system for a shuttle car utilizing a chain and cylinder arrangement.

While it is suggested in the prior art to have a free floating operator's compartment nowhere is there a means suggested for transferring a portion of vertical forces devloped between the mine floor and one end of an operator's compartment to the other end of the operator's compartment so that cocking of the operator's compartment is eliminated and the compartment floats levelly in the vertical direction with respect to the vehicle body as the vehicle travels over the undulating surface of the mine floor.

SUMMARY OF THE INVENTION

In accordance with the present invention there is provided a self propelled vehicle for use in a mine that includes a mobile body portion and ground traction means for supporting the mobile body portion for movement in the mine. An operator's compartment is positioned adjacent the vehicle body portion. A connecting assembly supports the operator's compartment for independent upward and downward movement of the operator's compartment on the vehicle body so that the operator's compartment is free to move independently of the body as the vehicle moves over the a regular contour of the mine floor.

The operator's compartment includes a protective canopy that is secured to the compartment and serves to protect the operator from solid material dislodged from the mine roof. By supporting the operator's compartment for movement on the body portion of the vehicle the bottom portion of the compartment remains in contact with the mine floor and thus provides additional overhead clearance for the installation of the protective canopy. With the additional overhead clearance the top surface of the protective canopy remains displaced from contact with the mine roof as the vehicle travels over the uneven and undulating mine floor. The canopy is supported by vertical members and can be adjusted with respect to the bottom of the operator's compartment by a hydraulic cylinder. Thus, the canopy may be raised or lowered on the compartment as is necessitated by the clearance between the top of the canopy and the mine roof.

The suspension system comprises at least one chain and sheave arrangement mounted on each end of the operator's compartment wherein each of the chains at either end of the operator's compartment has one end attached to the vehicle body and the other end attached to the opposite side of the operator's compartment. This is accomplished by having each chain run vertically from its attachment point on either side of the body upwardly around a first sheave then vertically downwardly around a second sheave located on the bottom of the operator's compartment, then horizontally to the opposite end of the compartment. Guide rollers between the operator's compartment and vehicle body resists horizontal forces relative to the vehicle body which forces are developed between the floor and the compartment and each chain is capable of transferring the vertical forces relative to the body developed between one end of the operator's compartment and the mine floor to the opposite end of the operator's compartment whereby the forces acting on each end of the compartment is equalized resulting in level vertical movement of the operator's compartment.

It is therefore an object of this invention to provide an operator's compartment for a self-propelled mine vehicle in which the operator's compartment is movably supported on the body portion of the vehicle such that when the vehicle moves over the uneven surface of the mine floor the entire compartment follows a contour of the mine floor.

It is an additional object of the invention to provide a method and apparatus for mounting the operator's compartment on the vehicle in a manner which allows the compartment to move levelly with respect to the vehicle body regardless of the location forces encountered by the bottom of the compartment as it floats along the mine floor.

It is yet an additional object of the invention to provide a system of suspending the floating operator's compartment from the mine vehicle body which resists cocking of the compartment and binding the track and guide system as the compartment travels vertically with respect to the mine vehicle.

It is still a further object of the invention to provide for a operator's compartment suspension system which transfers the vertical component of forces acting on one end of the operator's compartment to the opposite end of the operator's compartment to thereby distribute vertical forces evenly to prevent cocking.

DESCRIPTION OF THE PREFERRED EMBODIMENT

Figure 2:
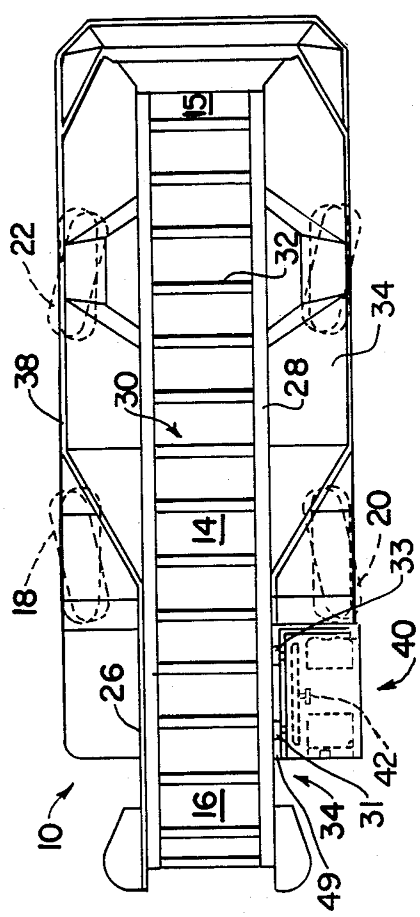
FIG. 2 is a plan view of a mine vehicle including its prior art floating operator's compartment shown in FIG. 1.
Figure 1:
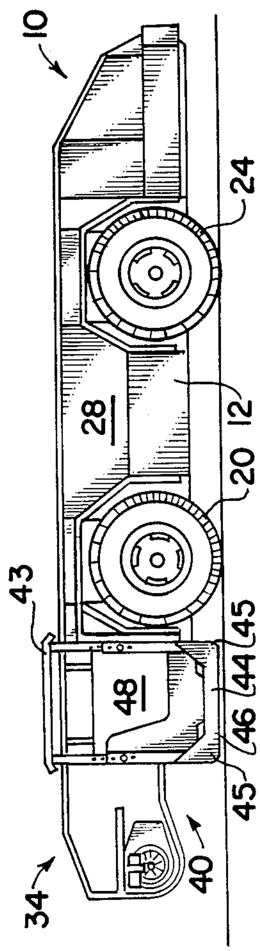
FIG. 1 is an elevation view of a mine vehicle incorporating a prior art floating operator's compartment.
Figure 3:
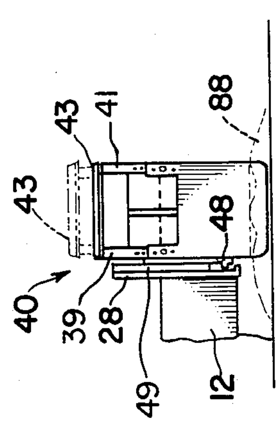
FIG. 3 is a side elevation view of the prior art operator's compartment shown in FIG. 2.

Referring to the drawings and particularly to the FIGS. 1, 2 and 3 labeled prior art, there is illustrated a mine shuttle car generally designated by the numeral 10 that includes a body portion 12 and a material receiving compartment 14 and a material discharge portion 16. The body portion 12 is mounted on a pair of front traction wheels 18 and 20 and a pair of rear traction wheels 22 and 24. The wheels 18 and 24 are mounted adjacent to side walls 26 and 28 of body 12 with the haulage compartment 14 extending there-between. The compartment 14 has a conventional enless flight conveyor 30 extending along its bottom portion. The flight conveyor 30 includes a plurality of cross flights 32 that are propelled by suitable side chains (not shown). The discharge end of the conveyor 30 extends along a tiltable end frame 34 which is pivotally arranged to effect variations of the discharge height of the vehicle discharge end portion 16. The endless conveyor 30 is propelled by a pair of sprockets that are secured to a cross shaft which is propelled by a suitable prime mover. Further details of the shuttle car which are beyond the scope of the present invention are illustrated and described in U.S. Pat. No. 3,067,830.

The haulage vehicle or shuttle car 10 has adjacent the discharge end portion 16 at one side of the material receiving compartment 14 a compartment 36 in which a suitable prime mover is positioned. A second prime mover, if desired, may positioned on the opposite side of the haulage vehicle 38 between wheels 18 and 20. An operator's compartment generally designated by the numeral 40 is positioned adjacent the discharged end portion 16 and is movably supported on the vehicle body portion in accordance with the present invention. The prior art operator's compartment 40 serves as a station for the operator and has a suitable steering wheel 42 and the other necessary controls by which the vehicle may be operated and steered.

The prior art operator's compartment 40 has a body portion 44 and a bottom 46 that is connected to the body portion 44 by the transition portions 45.

The compartment body portion 44 includes a vertical rear wall 48 positioned adjacent the vehicle frame 49. The opposite side of the compartment 40 is open to provide ingress and egress to the compartment. A protective overhead canopy 43 overlies the operator's compartment 40 and is supported thereabove by vertical members 39 and 41 that extend upwardly from the body portion 44 and are vertically adjustable as explained hereinbelow to affect variations in the height of the canopy 43 above the compartment body portion 44.

The prior art floating operator's platform has a pair of guides 31 and 33 which slide within tracks in the vehicle frame portion 49. The guides 31 and 33 are physically constrainted so that motion is in the verticle direction only.

Figure 11:
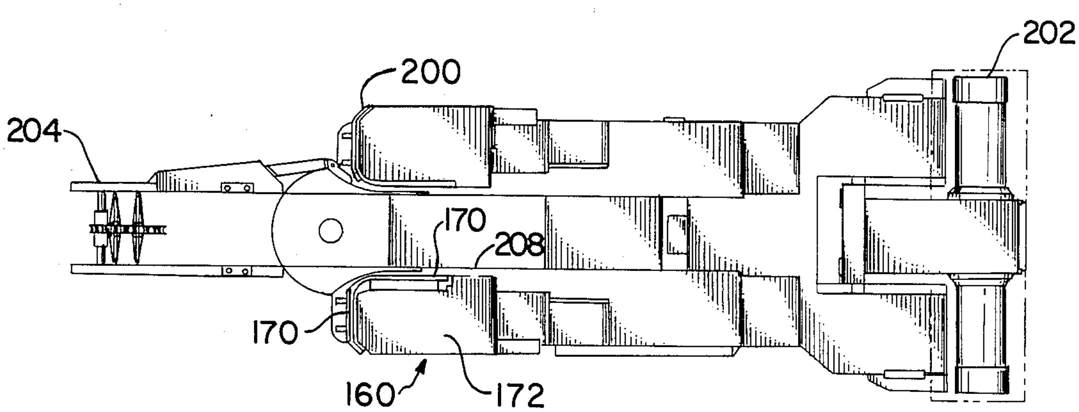
FIG. 11 is a plan view of a continuous mining machine having the floating operator's compartment.
Figure 12:
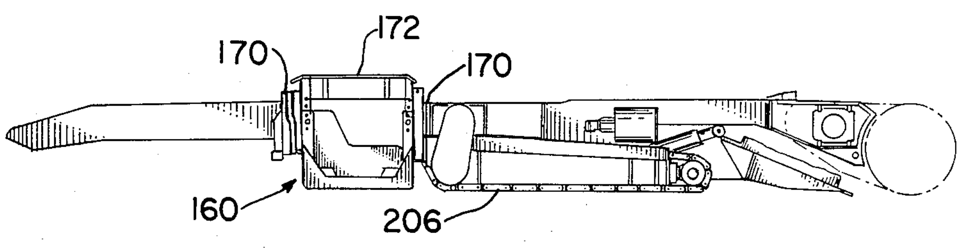
FIG. 12 is an elevation of a continuous mining machine having the floating operator's compartment shown in FIG. 11.

As can be best seen in FIGS. 11 and 12, there is shown a typical continuous mining machine generally designated at 200 which has at its forward portion a cutting head 202 and at its rearward portion a discharge conveyor 204. Adjacent one side of the conveyor 204 is the preferred operator's compartment generally denoted as 160.

In general the operator's compartment 160 is located rearwardly of the drive tracks 206 of the mine vehicle 200. A frame 170 is fixedly attached to the body 208 of the mine vehicle 200.

Figure 5:
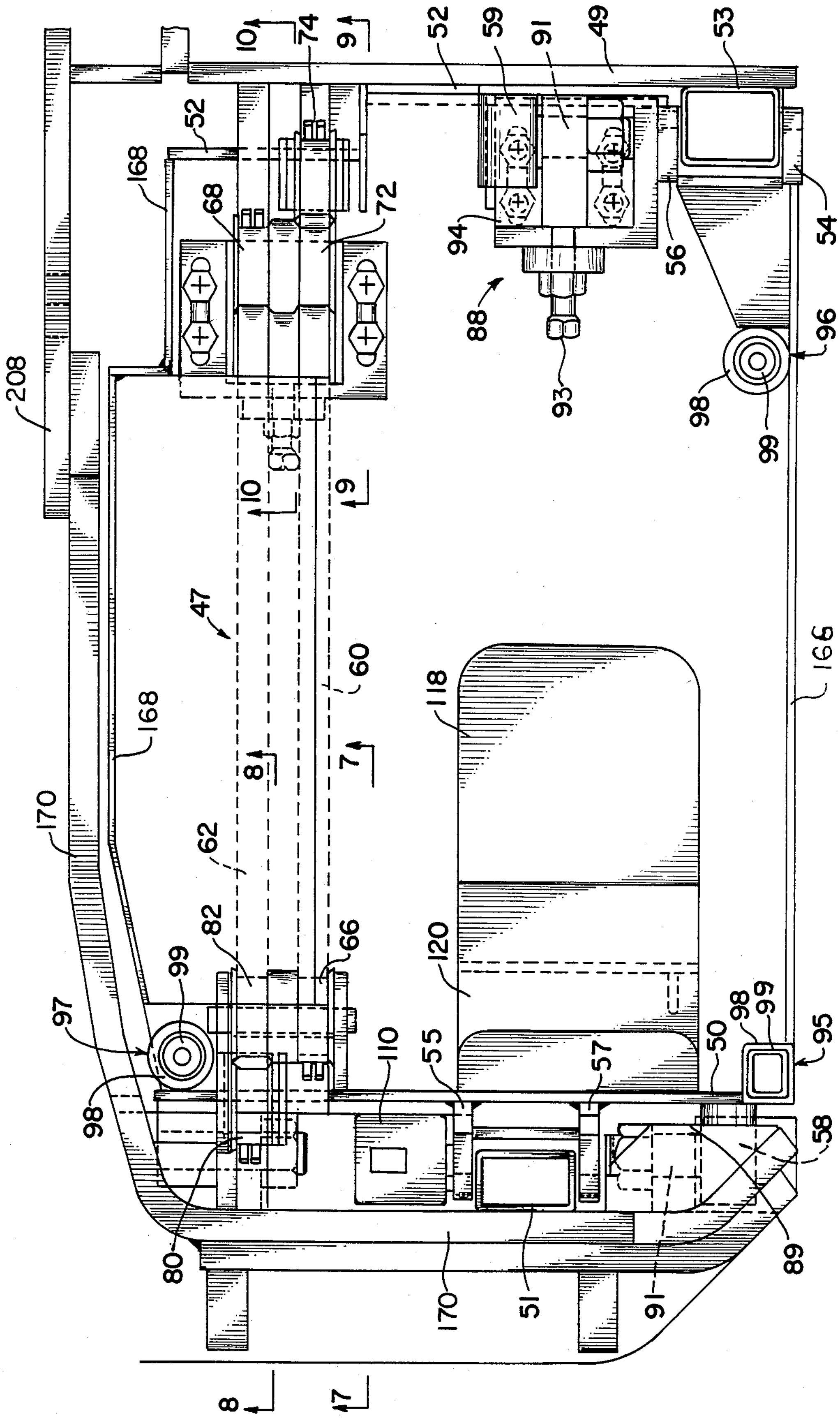
FIG. 5 is a plan view of the operator's compartment shown in FIG. 11.
Figure 6:
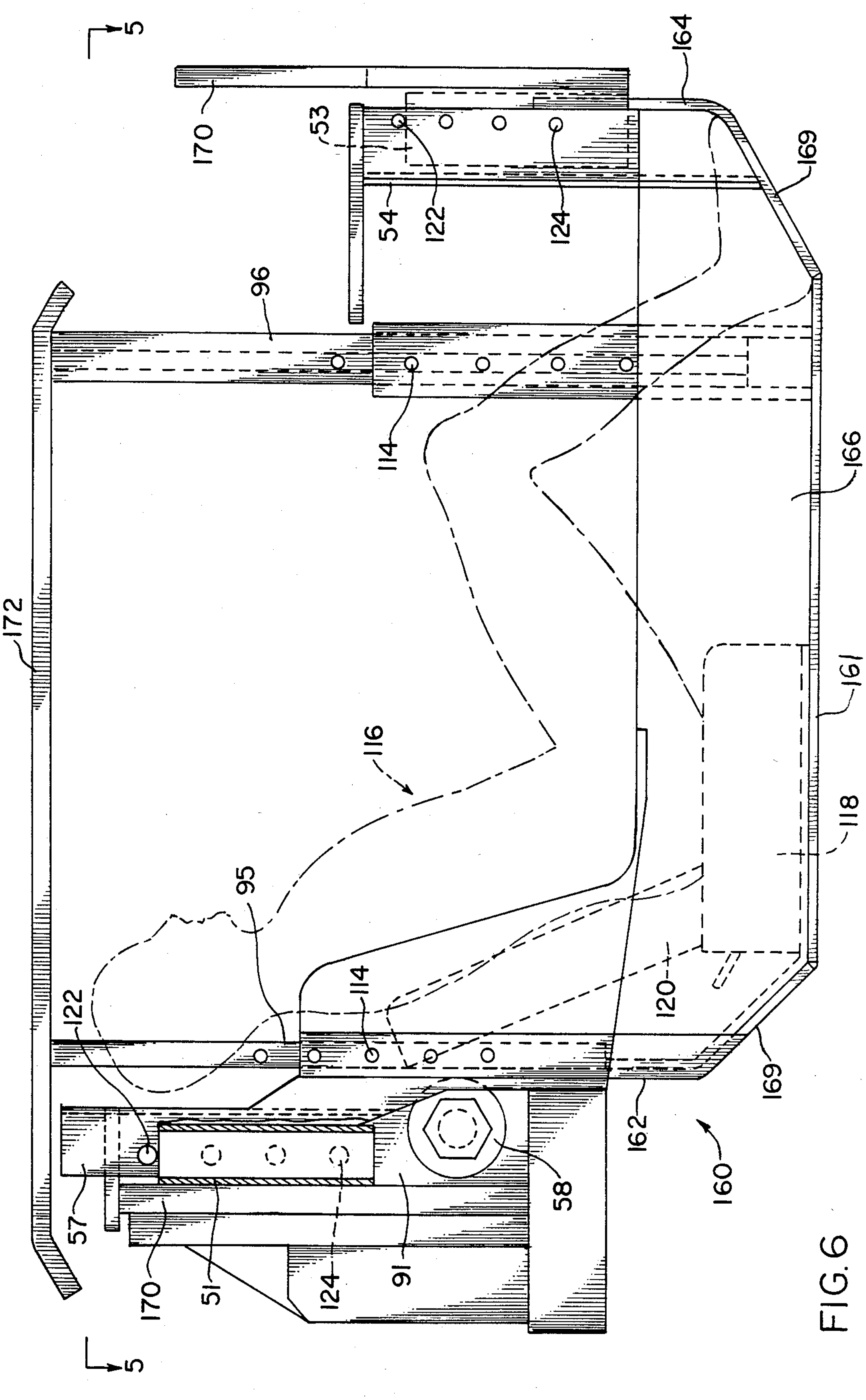
FIG. 6 is an elevation view of the operator's compartment shown in of FIG. 5.
Figure 7:
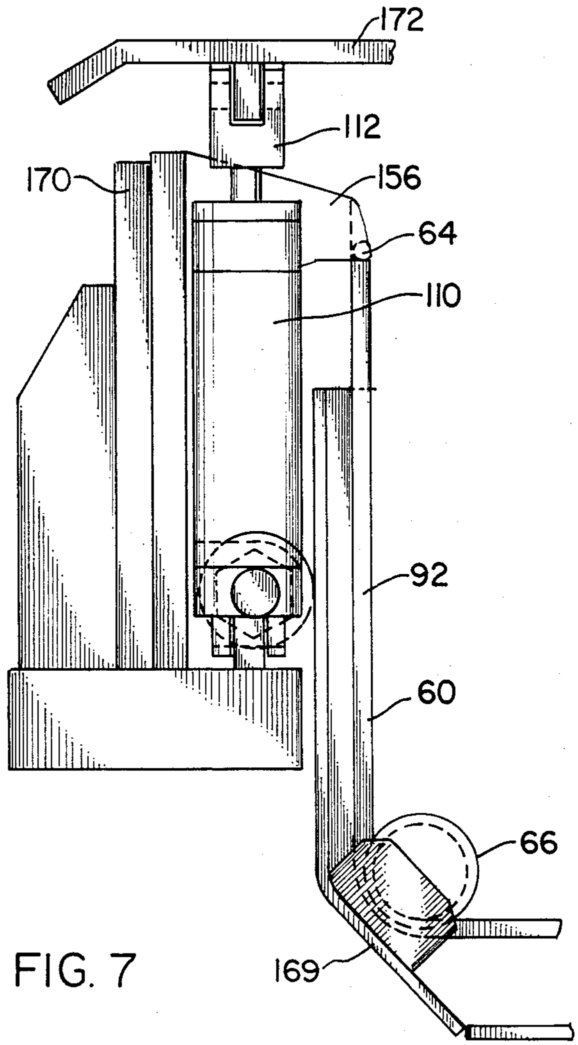
FIG. 7 is a partial sectional view of the operator's comparment shown in FIG. 5 along lines 7—7.

In the preferred embodiment as best seen in FIGS. 5 and 6, the operator's compartment of the present invention 160 has left and right side walls, 162 and 164 respectively. The preferred compartment has a front wall, 166, which is cut out to allow the ingress and egress of the driver of the vehicle. The preferred operator's compartment has a rear wall, 168, adjacent to the frame of the vehicle, a bottom portion and transition portions 169.

The operator's compartment is guided between the left side of frame 170 for up and down vertical movement by tubular guide members 51 and 53 which are welded to the frame 170. The tubular members 51 and 53 are surrounded by guide plates 54, 55, 56 and 57 which are welded to the side walls 162 and 164 of the operator's compartment. To facilitate the upward and downward movement of the operator's compartment around the guide members 51 and 53, a pair of rollers, 58 and 59, are mounted between the side walls of operator's compartment and the frame 170 of the vehicle. Roller 58 is mounted on a bracket, 89 and is in rolling contact with sidewall 50 of the compartment. The bracket 89 is fixedly attached to the frame 170 of the vehicle. The preferred rollers, 58 and 59, are made of steel and are mounted on a shaft, 91, for free rotation with respect thereto.

The roller 59 is mounted on an adjustable bracket member fixed to the operator's compartment for movement therewith. The roller, 59, extends through the side wall 52 into engagement with the side portion of the frame 170. It can be seen that the combination of the rollers 58 and 59 and the guide members 53 and 51 prevents cocking of the operator's compartment about the vertical axis as the operator's compartment moves vertically with respect to the frame of the vehicle. The adjustment means generally denoted as 92 is utilized to ensure that the rollers 58 and 59 engage in their respective walls with sufficient force to maintain the compartment from cocking about the vertical axis. An adjustment screw, 93, is provided to move the frame, 94, on which the roller 59 sits towards or away from frame wall 170.

In the preferred embodiment, a canopy 172 is supported by 3 tubular post members, 95, 96 and 97 respectively. In the preferred embodiment two of the post members are circular and the post member 95 is rectangular in cross section. The only reason that post member 95 is rectangular is that it forms the corner of the operator's compartment. In each case, the tubular members 95, 96, and 97 have an outer tubular portion, 98, and an inner tubular portion, 99. The tubular members 98 and 99 are sized such that the canopy can be raised or lowered without interference between the members 98 and 99. In the preferred embodiment the hydraulic cylinder 110 is utilized to lift the canopy 172 via a clevis arrangement 112.

As can be best seen in FIG. 6, the tubular members 95, 96 and 97 have a series of holes, 114, drilled through both the outer and inner tubular members thereof. An adjustment pin (not shown) can be inserted through the inner and outer tubular member of each tubular post 95, 96 or 97 to mechanically lock the canopy in the desired position with respect to the operalar member of each tubular post 95, 96 or 97 to mechanically lock the canopy in the desired position with respect to the operator 116.

As can be seen in FIG. 6, the operator 116 is seated on seat 118. Seat 118 has an adjustable back portion, 120, which can be adjusted for the comfort of the operator.

In the preferred embodiment, as can be best seen in FIG. 6, the entire operator's compartment, 160, can be adjusted in the vertical direction with respect to vehicle frame 170. This is accomplished by a series of holes 122 in guide plates 54, 55, 56 and 57. A pin (not shown) can be inserted through the holes 122 of both plates 55 and 57 or 54 and 56 so that the outer diameter of the pin rests on top of tubular member 51 and/or 53. As can be seen, this method of adjustment moves the lower limit of travel for the operator's compartment base, 161, either upwardly or downwardly in the vertical direction. By pinning the operator's compartment at a higher level, such as by using hole 124, the clearance between the base of the operator's compartment and the ground about which the floating movement described hereafter occurs, is greatly increased.

In order to permit vertical "floating" movement of the operator's compartment with respect to the vehicle body a system is utilized to transfer forces acting on the bottom of the vehicle compartment equally to the supports on botle body a system is utilized to transfer forces acting on the bottom of the vehicle compartment equally to the supports on both sides of the compartment so that the platform will move levelly with respect to the vehicle body.

As can be seen in FIG. 5, there is located at the rear of the operator's compartment a chain and pulley system which acts to transfer the forces to act equally on all the supports for the platform so that the movement of the platform in the vertical direction is level about a horizontal plane running from the front of the compartment to the back of the compartment. This chain and pulley system, generally denoted as 47, is composed of two chains, 60 and 62. The chains wrap around a series of pulleys or sheaves 66, 68, 72, 74, 80 and 82. As can be seen the chains 60 and 62 run across the bottom of the operator's compartment and engage the pulleys or sheaves.

The preferred embodiment of this system is best illustrated in FIGS. 4, 5, 6 and 7. These figures disclose the two chains 60 and 62 which run over the pulleys or sheaves mounted in the operator's compartment. The ends of the chains 60 and 62 are attached to the vehicle body.

Figure 8:
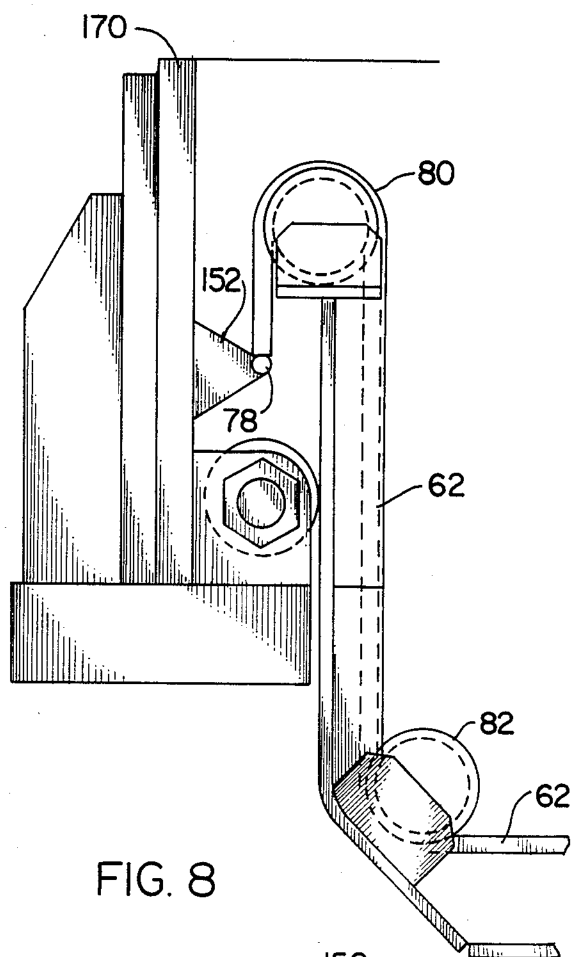
FIG. 8 is a partial sectional view of the operator's compartment shown in FIG. 5 along lines 8—8.
Figure 9:
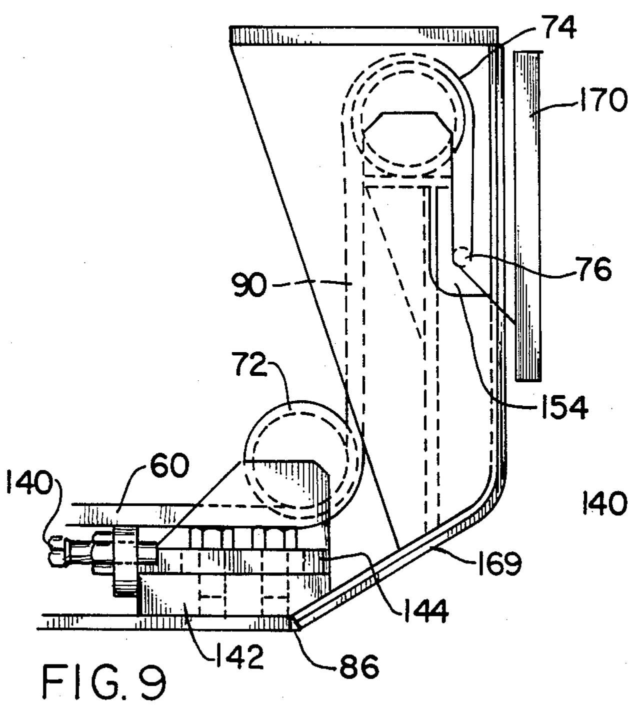
FIG. 9 is a partial sectional view of the operator's compartment shown in FIG. 5 along lines 9—9.

In the preferred embodiment, as is best seen in FIGS. 7 thru 10, the chain 60 is attached to the forward end of frame 170 fixed to the mine vehicle at point 64 located on bracket 156 which overhangs the path of the operator's compartment 160. The chain 60 runs vertically downward with respect to the vehicle around sheave or pulley 66 and horizontally across the bottom of the compartment 160 to the opposite end of the operator's compartment. As can be seen in FIG. 9, the chain 60 then goes vertically around the sheave or pulley 72 then vertically or upwardly around the pulley 74 then vertically downwardly where the chain in attached to the vehicle frame 170 at point 76 on bracket 154.

In the preferred embodiment the pulley 66, 72 and 74 are capable of rotating such as on bearings around a shaft to increase the ease of movement of chains 60 as the operator's compartment moves with respect to the vehicle body in the vertical direction.

Figure 10:
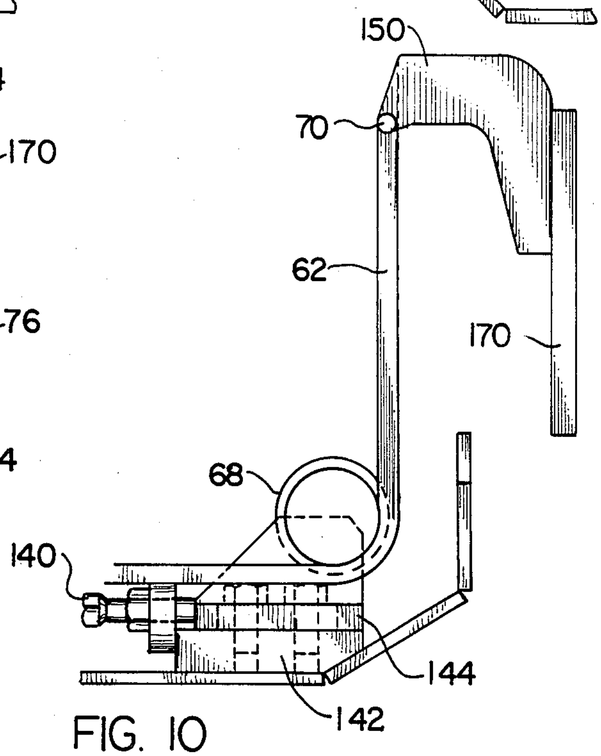
FIG. 10 is a partial sectional view of the operator's compartment shown in FIG. 5 along lines 10—10.

As can be seen in FIGS. 8 and 10 a second chain 62 is utilized in the preferred embodiment to perform the force distribution function for forces acting on the left side of bottom 161 of compartment 160. It can be seen that the pulley and chain arrangement described above transfers forces acting on the right hand side of bottom 161 to the left side of the compartment 160 via the force exerted on pulley 66.

The chain 62 has one end fixedly attached to the vehicle body at point 78 on bracket 152. The chain 62 moves in the vertically upward direction from point 78 around a pulley or sheave 80 then vertically downward along the inside front wall of the operator's compartment around a second pulley 82 then horizontally towards the rear of the compartment then around pulley 68 and vertically upward to attachment point 70 on bracket 150 which is fixed to the vehicle body.

In the preferred embodiment there is a chain adjustment system generally denoted as 142 that is capable of keeping both of the chains 60, 62 taut so that forces acting on one side of the vehicle operator's compartment are uniformly transferred to the other side across the bottom of the compartment. In a preferred embodiment this system consists of a movable base, 144, for pulleys 72 in FIG. 5 or 68 in FIG. 6. The base 144 which can be adjusted by a mounting arrangement on a screw. If the chain is either to loose or to tight the screw 140 is turned in the desired direction which moves the mounting base 144 either to the front or rear of the operator's compartment so as to affect the proper tensioning of the chain.

In the preferred operation of the described vehicle compartment when a force is developed say at point 86 along the bottom of the operator's compartment such as when the vehicle encounters a rise on the mine floor such as 88 the right side of the operator's compartment is forced upward in the vertical direction. This force is transferred to the chain 60 by movement of pulley 74 in the vertically upward direction. Note that all pulleys or sheaves 66, 68, 72, 74, 80 and 82 are mounted on the floating operator's compartment for vertical movement therewith. Since the chain 60 is inextensible and has a first end attached to point 76 and the second end attached to point 64 so that the vertical forces imparted by pulley or sheaves 74 are resisted equally at point 76 and 64. Since the chain is inextensible, as sheave or pulley 74 moves upward the vertical forces in the portion of chain 60 designated as 90 and 92 are equal thereby lifting sheave 66 and 72 equal amounts. Therefore, the force in the vertical direction acting at point 86 on the bottom of the operator's compartment has been distributed in equal portions by chain 60 to act on sheave 72 and 66 so that movement of the bottom of the operator's compartment is totally level with respect to the vehicle body.

It can be seen that a similar force distribution occurs if a forces acts on the other side (the left side) of the operator's compartment whereby forces are transferred by chain 62 to act equally on support points 70 and 78.

Furthermore, it can be seen that any combination of forces acting on any point on the bottom portion 161 or transition portion 163 of the operator's compartment 160 are effectively distributed to act equally on each side of the compartment thereby keeping the compartment level with respect to the body as it floats across the mine floor.

Figure 4:
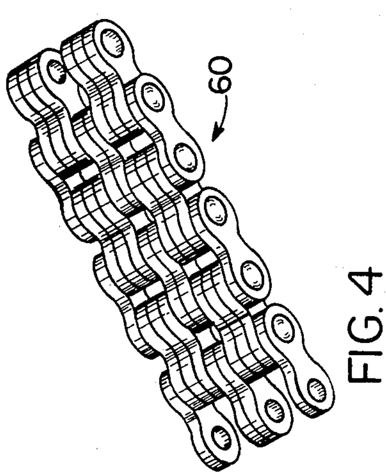
FIG. 4 is an isometric view of a typical chain used in the present invention.

The preferred chain is shown in FIG. 4 and is a typical 4 by 6 leaf chain. The overall width of this chain is 1 and 13/32 inches and has a rated minimum ultimate strength of 22,000 pounds. If should be noted that other chains with varying minimum ultimate tensile strengths are available and can be properly chosen to provide adequate force transferral for any size operator compartment.

While there are in this application specifically described one preferred form of the invention, it will be understood this form is shown for purposes of illustration and the invention may be further modified and embodied in various other forms without departing from its spirit or the scope of the appended claims.

I claim:

1. A suspension system for the operator's compartment of a mine vehicle having a body wherein the operator's compartment is of the type freely floatingly supported on said body adjacent one side thereof for riding on the mine floor as said vehicle moves in said mine, said suspension system comprising:

a chain means secured to said body for supporting said compartment for generally vertical movement with respect to said body; and said chain means includes means for distributing equally to each end of said compartment the forces developed between said mine floor and any point on the operator's compartment whereby each end of said operator's compartment moves the same upward vertical distance with respect to said body as said operator's compartment floats upwardly in response to enegagement with said mine floor.

2. A suspension system for the operator's compartment of a vehicle as set forth in claim 1 wherein said chain means consists of two chains supporting said operator's compartment with respect to said body, each of said chains having both ends thereof attached to said body, said chains resisting the horizontal forces developed between said mine floor and said operator's compartment and transferring in equal portions to each side of said compartment the vertical forces developed between said floor and said compartment.

3. A suspension system for an operator's compartment as set forth in claim 2 wherein said chain arrangement comprises a chain having each end mounted on said body, said chain extending around three sheaves mounted on said operator's compartment, said sheaves located on said operator's compartment so said chain runs vertically upward around said first sheave then vertically downward around a second sheave then horizontally across the bottom of said operator's compartment then vertically upwardly around said third sheave with the other end of said chain fixed to the opposite wall of said body.

4. A suspension system for an operator's compartment of a mine vehicle as set forth in claim 1 wherein the lower most position of the operator's compartment on the mine vehicle with respect to the mine floor is adjustable.

5. A suspension system as set forth in claim 4 wherein said adjustment is accomplished by pinning said operator's compartment to the body in a manner permitting upward or downward adjustment of the support point for said compartment with respect to said body without adjusting the support points of said chain.

6. A suspension system for an operator's compartment as set forth in claim 1 wherein said operator's compartment has rollers mounted thereon for engagement with guide means located on said body for vertical movement with respect thereto and to resist side to side motion of said operator's compartment.

7. An improved suspension system for an operator's compartment of a mine vehicle, said operator's compartment of the type which is supported on said body for free floating independent vertical movement realtive thereto as the bottom of said operator's compartment rides on the mine floor as the vehicle traverses the mine, the improvement comprising:

means for mounting said compartment on said body said means for mounting includes means for simultaneously lifting said forward and rearward ends of said operator's compartment in response to a vertical forces relative to said body developed between said mine floor and said operator's compartment whereby rotational forces about the center line between said rearward and said forward end of said operator's compartment are eliminated.

8. A suspension system for the operator's compartment of a vehicle as set forth in claim 7 wherein said means for mounting consists of two chains supporting said operator's compartment with respect to said body, each of said chains having both ends thereof attached to said body, said chains resisting the horizontal forces developed between said mine floor and said operator's compartment and transferring in equal portion to each side of said compartment the vertical forces developed between said floor and said compartment.

9. A suspension system for an operator's compartment as set forth in claim 8 wherein said chain arrangement comprises a chain having one end mounted on said body, said chain extending around three sheaves mounted on said operator's compartment, said sheaves located on said operator's compartment so said chain runs from said body verticaly upward around said first sheaves then vertically downward around a second sheave then horizontally across the bottom of said operator's compartment then vertically upward around said third sheave with the other end of said chain fixed to said body adjacent said operator's compartment.

10. A suspension system for an operator's compartment of a mine vehicle as set forth in claim 7 wherein the lower most position of the operator's compartment on the mine vehicle with respect to the mine floor is adjustable.

11. A suspension system for an operator's compartment of a mine vehicle, said operator's compartment of the type mounted on a body of said mine vehicle for free floating independent vertical movement with respect to said body as said vehicle traverses said mine with the bottom of said operator's compartment moving along the floor of said mine, said suspension system comprising:

at least one chain and sheave arrangment mounted on each end of said operator's compartment wherein each of said chains at either end of said operator's compartment has one end attached to said body and the other end attached to the opposite side of said operator's compartment, said chain running verticaly from said attachment point on said body upwardly around a first sheave, then vertically downwardly around a second sheave located on the bottom of said operator's compartment then horizontally to said opposite end of said operator's compartment and vertically upward to a connecting point on said body, said chain resisting horizontal forces relative to said body developed between said floor and said compartment and transferring vertical forces relative to said compartment and transferring vertical forces relative to said body developed between one end of said operator's compartment and said mine floor to said opposite end of said operator's compartment ped between one end of said operator's compartment and said mine floor to said opposite end of said operator's compartment whereby the force acting on each end of said compartment are equalized resulting in level movement of said compartment in the vertical direction.

12. A suspension system for an operator's compartment of a mine vehicle as set forth in claim 11 wherein the lower most position of the operator's compartment on the mine vehicle with respect to the mine floor is adjustable.

13. A suspension system as set forth in claim 12 wherein said adjustment is accomplished by pinning said operator's compartment to the body in a manner permitting upward or downward adjustment of the support point for said compartment with respect to said body without adjusting the supporting points of said chain.

14. A suspension system for an operator's compartment as set forth in claim 11 wherein said operator's compartment has rollers mounted thereon for engagement with guide means located on said body for vertical movement with respect thereto and to resist side to side motion of said operator's compartment.

15. A method for mounting an operator's compartment on a mine vehicle body for independent level vertical movement with respect thereto as said vehicle traverses a mine floor, said method comprising the steps of:

supporting said compartment on said body in a manner permitting vertical movement of said compartment with respect to said body;

resisting horizontaly forces between said body and said vehicle compartment developed when said compartment engages said mine floor;

distributing the vertical forces between said compartment and said body developed when said compartment engages said mine floor;

distributing the vertical forces between said compartment and said body developed when said compartment engages said mine floor in equal portions to each end of said operator's compartment whereby each end of said compartment is lifted the same vertical distance with respect to said body.

* * * * *